Figure 1:
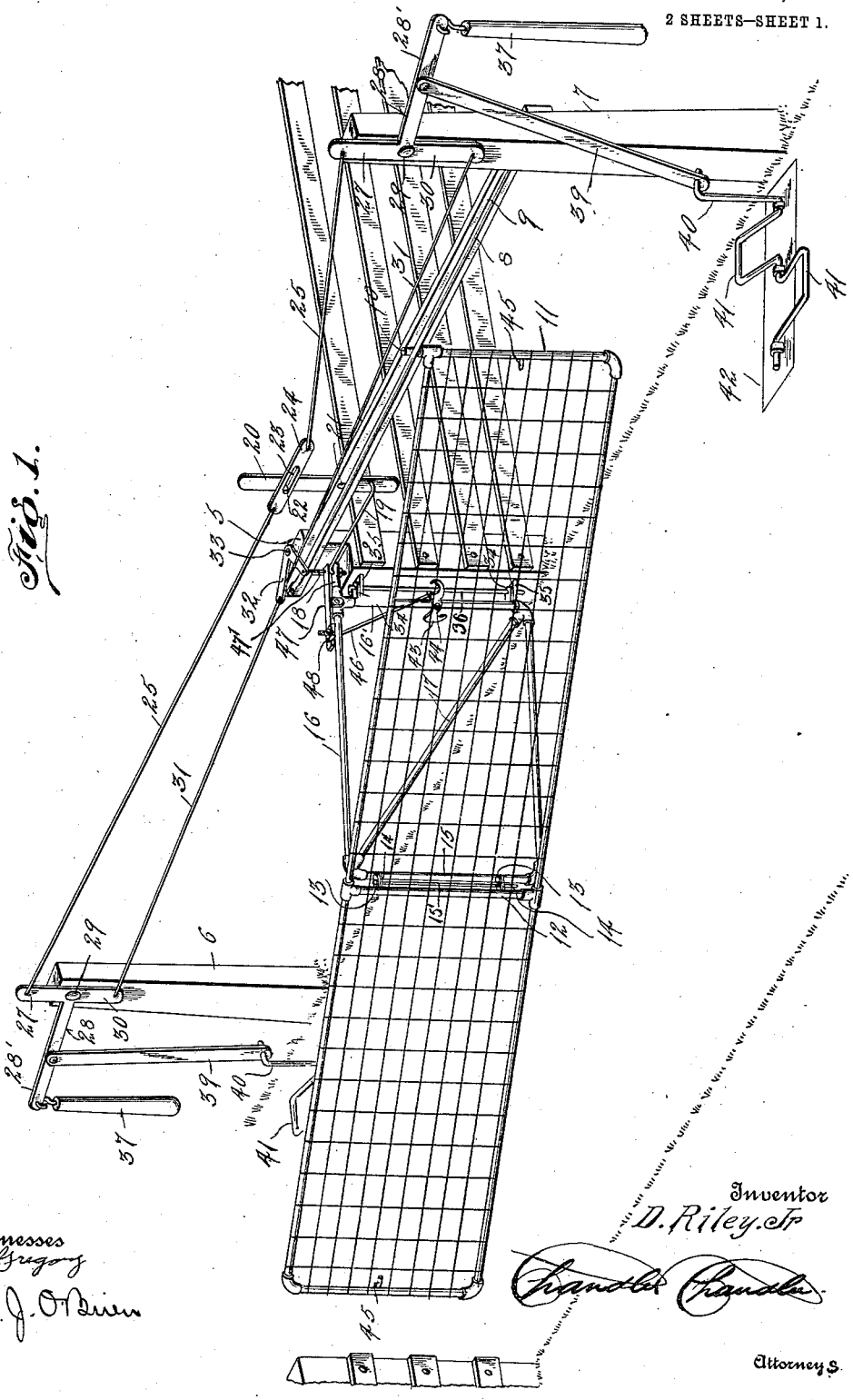

D. RILEY, Jr.
GATE.
APPLICATION FILED FEB. 1, 1911.

1,044,915.

Patented Nov. 19, 1912.
2 SHEETS—SHEET 1.

Witnesses
Jos Gregory
Jos. J. O'Brien

Inventor
D. Riley Jr
Chandler Chandler
Attorneys

D. RILEY, Jr.
GATE.
APPLICATION FILED FEB. 1, 1911.
1,044,915.
Patented Nov. 19, 1912.
2 SHEETS—SHEET 2.
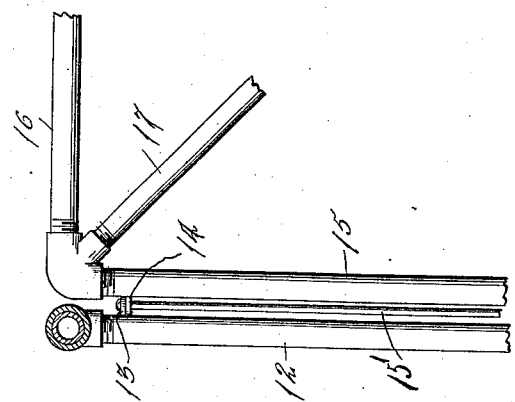
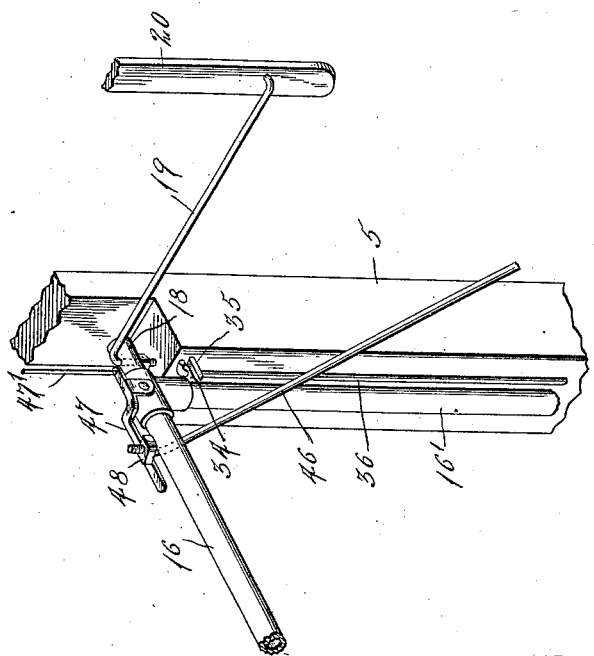
Witnesses
Jos Gregory
Jos. J. O'Brien
Inventor
D. Riley, Jr.
By 
Attorneys

UNITED STATES PATENT OFFICE.

DANIEL RILEY, JR., OF PITTSFIELD, ILLINOIS.

GATE.

1,044,915.   Specification of Letters Patent.   Patented Nov. 19, 1912.

Application filed February 1, 1911. Serial No. 605,929.

*To all whom it may concern:*

Be it known that I, DANIEL RILEY, Jr., a citizen of the United States, residing at Pittsfield, in the county of Pike, State of Illinois, have invented certain new and useful Improvements in Gates; and I do hereby declare the following to be a full, clear, and exact description of the invention, such as will enable others skilled in the art to which it appertains to make and use the same.

This invention relates to improvements in gates and means for swinging the same into open and closed position and the leading object of the invention is to provide an improved mechanism and gate which will not bind at any stages of its operation.

Another object of the invention is to provide an improved gate comprising a swinging frame and a support therefor which is hinged to the frame and hinged to a stationary support, a guide for the swinging frame and means for swinging the frame against the guide to and from a closed position.

With the above and other objects in view the invention consists in certain constructions, combinations and arrangements of parts, clearly described in the following specification, and clearly illustrated in the accompanying drawings, in which:—

Figure 1 is a perspective view of the improved gate and operating means therefor with the gate shown in a partly open position, Fig. 2 is a fragmentary perspective view of the gate operating means, Fig. 3 is a detail view partly in section showing the hinges for the gate.

Referring to the accompanying drawings 5 denotes a gate post which is located medially of the outer gate post 6 and 7. Guide bars 8 and 9 extend from the gate post 5 to the gate post 7 and are spaced apart to receive the vertical arm 10 of the swinging gate frame 11, which comprises a series of connected pipes and cross wires secured thereto.

The frame 11 is provided with a central vertical bar 12. The central cross bar 12 is provided with laterally extending hinge eyes 13 which engage the hinge eyes 14 of the end bar 15 of the operating frame 16 and are connected by a pintle rod 15′. The operating frame 16 is provided with a diagonally disposed brace bar 17. The operating frame 16 is further provided with an arm 18 which is pivotally connected with a link rod 19 pivoted to the lever 20, which lever is pivoted at 21 to the guide bar 9. The lever 20 is provided with a lateral pin 22 which projects through the longitudinal slot 23 of the link 24, which is connected with the operating wires or rods 25, the outer ends of which are connected with the uppermost terminals 27 of the operating levers 28 which are pivoted at 29 to the posts 6 and 7. The lower terminals 30 of the levers 28 are connected between the wires or rods 31 with one arm of the bell crank 32 which is pivoted at 33 to the central gate post 5, and the slot 23 thus permits proper disengagement of the latch to be hereinafter described, before the gate is operated, or pull is exerted thereon by allowing the pin 22 to slide therein before the lever 20 is rocked to open the gate.

The inner cross bar 16′ of the operating frame 16 is provided with hinge eyes 34 which engage the hinge eyes 35 that are secured to the post 5. A rod 36 extends through the hinge eyes 34 and 35 whereby the frame 16 is held to the post 5. The levers 28 are provided with arms 28′ which are normally disposed in horizontal planes and carry weights 37.

The arms 28′ are connected by the links 39 with the arms 40 of the double cranks 41, which cranks are pivoted to the base boards 42 near the posts 6 and 7 respectively.

The cross bar 16′ is provided with a latch member 43 which is pivoted intermediate its ends and is provided with end hook arms 44. The hook arms 44 are adapted to engage the hooks 45 carried by the end members of the gate frame 11. The latch member 43 is connected to a rod 46, the upper end of which is disposed on the side of the upper cross bar of the operating frame 16 opposite to the gate and the rod 47 which is connected thereto at its outer end is rigidly connected to the other arm of the lever 32 by a vertical rod 47′. The upper end of the rod 46 carries a nut 48 which serves to hold said upper end between the bar 47 and the upper cross bar of the operating frame 16. By pulling the rod 46 in either direction from opposite pull of the rods or wires 31 either one of the end hook arms 44 of the latch 43 may be engaged or disengaged with one of the hooks 45 of the gate frame 11, when said hook is in an adjacent position to the latch. In this way the gate 11 may be held in a wholly open or in a wholly closed position and in the operation, the bell crank is rocked and the bar 47 swung on its pivot to operate the latch.

In order to operate the gate pressure may be applied to either one of the double cranks 41 or to the weights 37, thereby rocking the vertical lever 20, pushing the link rod 19 and actuating the operating frame 16. When the gate frame 11 is in a closed position the arm 10 will occupy a position close to the arm 18 of the operating frame 16 and by suitably manipulating one of the double cranks 41 or one of the levers 28 the central lever 20 may be rocked and the arm 10 forced along the guides 8 and 9 thereby swinging the gate frame 11 into an open position. By a reverse movement the gate frame may be swung to a closed position. The weights 37 serve to balance the gate and to hold the same in the various positions it is placed.

What is claimed is:—

1. A gate comprising a vertical support, an operating frame hinged at one end to said vertical support, a horizontal arm secured to the operating frame, a double latch carried by the operating frame and connected to the arm, a gate frame hinged to the other end of the operating frame and intermediate of its ends, a bell crank mounted on the support and connected to the arm, a vertical arm on said gate frame, guides for said vertical arm, a vertical lever mounted on one of the guides and pivotally connected with the inner end of the operating frame beyond the pivot and a T-shaped lever pivotally supported distantly of the first lever and pivotally connected to the first lever and bell crank upon opposite sides of its pivot for swinging the gate into open and closed positions and simultaneously operating the latch.

2. A gate comprising a series of vertical supports located distantly from each other, an operating frame hinged to one of said supports and provided with a horizontally extending arm located adjacent said support, a gate frame hinged to said operating frame and provided at one end with a vertical arm, guides fixed to two of said supports for the vertical arm of said gate frame, a lever pivoted to one of said guides intermediate of its ends, a link rod connecting the lower end of said lever with the horizontal arm of the operating frame, a pin mounted on the upper end of the lever, a link having limited sliding connection with said pin and lever, levers mounted on the outer vertical supports, rods connecting said levers with the sliding link, means connecting the levers to each other independently of said first rods, and cranks for operating the last levers.

In testimony whereof, I affix my signature, in presence of two witnesses.

DANIEL RILEY, Jr.

Witnesses:
O. D. GICKER,
W. S. BINNS.

---

Copies of this patent may be obtained for five cents each, by addressing the "Commissioner of Patents. Washington, D. C."